Dec. 18, 1956   R. S. EVANS   2,774,612
DROP FRAME BOAT TRAILER
Filed Sept. 30, 1955   2 Sheets-Sheet 1
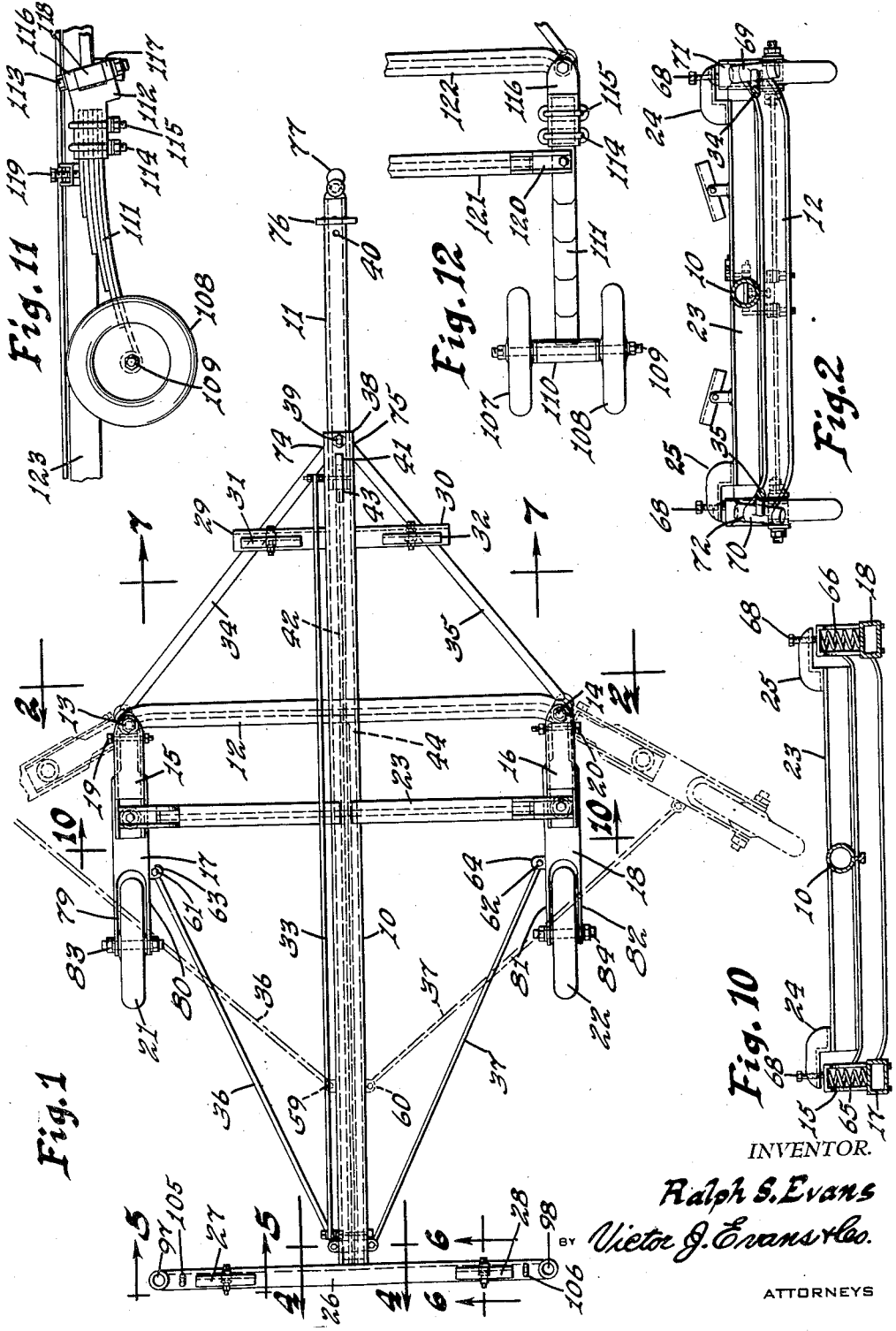
INVENTOR.
Ralph S. Evans
BY Victor J. Evans & Co.
ATTORNEYS

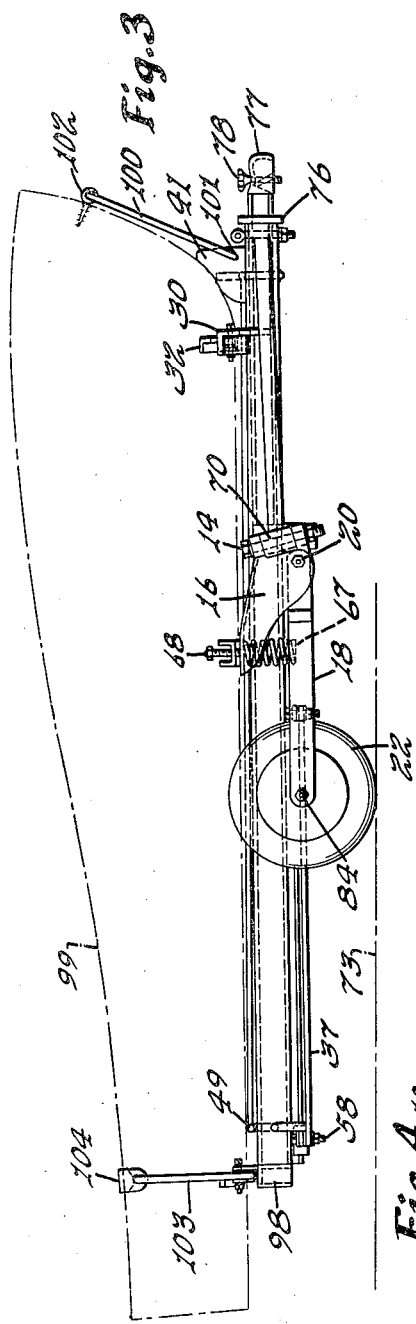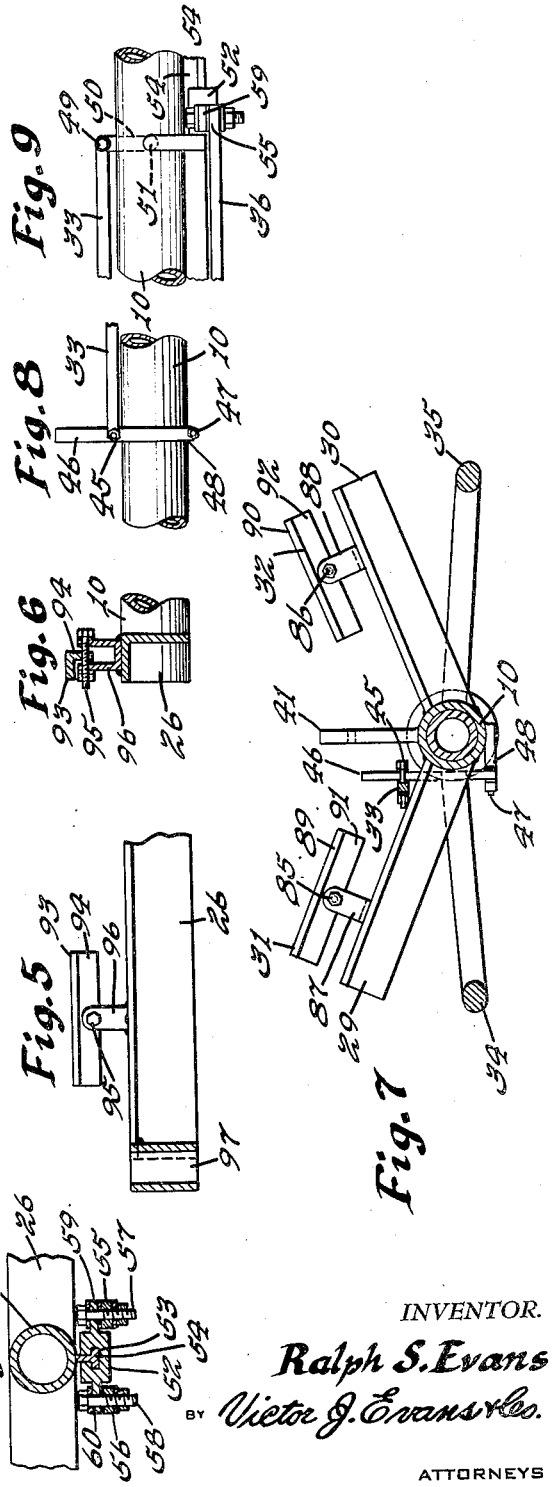

United States Patent Office 2,774,612
Patented Dec. 18, 1956

2,774,612

DROP FRAME BOAT TRAILER

Ralph S. Evans, Miami, Fla.

Application September 30, 1955, Serial No. 537,639

3 Claims. (Cl. 280—414)

This invention relates to trailers for transporting boats, such as from a residence to a beach or from water to a residence, and in particular a two wheel trailer frame wherein the wheels are connected to the frame with king bolts, the axes of which are inclined whereby upon backing the trailer, such as towards the water, the wheels spread and move upwardly in relation to the frame dropping the trailing portion of the frame and thereby facilitating launching the boat.

The purpose of this invention is to provide a boat trailer that is adapted to be operated by an individual so that a fisherman may readily transport the boat from his residence to the water and return with the boat without the aid of help.

Various types of boat trailers have been provided that are adapted to be attached to motor vehicles and that may be used for transporting boats from one position to another, however, with the conventional type of trailer wherein the floor or frame is in spaced relation above the ground it is difficult for an individual to remove a boat from a trailer and it is also difficult to return the boat to a carrying position on the trailer. With this thought in mind this invention contemplates a boat trailer in which wheels at the sides thereof are pivotally connected to an axle or bolster with king bolts in which the king bolts are inclined in both longitudinal and lateral planes whereby upon backing the trailer the wheels move outwardly and the trailer frame drops downwardly.

The object of this invention is, therefore, to provide means for mounting boat carrying trailers on wheels whereby the wheels are actuated to drop the trailer frame to facilitate removing a boat from the frame and also to facilitate returning the boat to the frame.

Another object of the invention is to provide a boat trailer of the drop frame type in which the boat is carried on the frame with cradles in which the boat may readily be secured in traveling position on the trailer and also readily released therefrom.

A further object of the invention is to provide an improved boat carrying trailer of the drop frame type in which the trailer is of a simple and economical construction.

With these and other objects and advantages in view the invention embodies an elongated tube providing a center beam, a tongue slidably mounted in the tube and provided with latching means, transversely disposed cradles extended from the center beam, a transversely positioned bolster or axle also extended from the center beam, wheels rotatably mounted in wheel carrying brackets with the brackets pivotally mounted at the ends of the axle with king pins or bolts and with the axes of the king pins or bolts inclined in both longitudinally disposed and transversely disposed planes. The trailer also includes diagonally disposed braces and latching means for retaining the wheel carrying elements in adjusted positions.

Other features and advantages of the invention will appear from the following description taken in connection with the drawings, wherein:

Figure 1 is a plan view of the improved boat trailer showing the wheels in the traveling position in which the trailer frame is elevated in full lines and in the spread or elevated position wherein the frame of the trailer is dropped substantially to the surface of the ground in broken lines.

Figure 2 is a cross section through the forward part of the trailer taken on line 2—2 of Fig. 1 illustrating the mounting of the parts and showing the inclined axes of the king bolts securing the wheel carrying brackets to the frame or ends of the axle thereof.

Figure 3 is a side elevational view of the improved boat trailer showing the device in a traveling position with the tongue retracted and with a boat indicated thereon with broken lines, said view also showing the inclined axes of the king bolts whereby the bolts are inclined in longitudinally disposed planes.

Figure 4 is a cross section through the rear portion of the tubular center beam showing connections of sway braces to a traveler slidably mounted on a tongue extended from the under surface of the beam.

Figure 5 is a section taken on line 5—5 of Fig. 1 illustrating the cradle mounting on the ends of the cross beam and showing a receiving socket for guide stanchions for guiding a boat on the trailer.

Figure 6 is a cross section taken on line 6—6 of Fig. 1 also showing the cradle mounting of the cross beam.

Figure 7 is a cross section taken on line 7—7 of Fig. 1 showing the cradle and cross bars at the forward end of the frame.

Figure 8 is a detail showing a hand lever for actuating the locking rod extended from the forward end of the center beam to a latch at the trailing end thereof.

Figure 9 is a view showing the trailing end of the locking rod with the locking device for retaining the wheels in traveling positions.

Figure 10 is a cross section through the frame taken on line 10—10 of Fig. 1 showing adjusting screws for equalizing the load on wheel carrying brackets pivotally connected to the ends of the axle with king bolts.

Figure 11 is a side elevational view illustrating a modification wherein the wheel carrying brackets of Figs. 1 and 3 are replaced with leaf springs which are also connected to sides of the frame or ends of the axle with king bolts.

Figure 12 is a plan view showing the mounting of one of the wheel carrying brackets as illustrated in Fig. 11.

Referring now the drawings wherein like reference characters denote corresponding parts the improved drop frame boat trailer of this invention includes a tubular center beam 10, a tongue 11 slidably mounted in the beam 10, an axle 12 secured to the under surface of the beam 10 and having inclined king bolts 13 and 14 in the ends for connecting wheel mounting arms 15 and 16 to the axle, brackets 17 and 18 pivotally connected to the arms 15 and 16 with bolts 19 and 20, respectively, wheels 21 and 22 rotatably mounted in the brackets 17 and 18, an intermediate transversely disposed beam 23 having arms 24 and 25 at the ends for regulating the positions of the wheel carrying arms, a cross beam 26 carried by the trailing end of the center beam 10 and providing supporting means for cradles 27 and 28, arms 29 and 30 providing supporting means for cradles 31 and 32, respectively, a locking rod 33 for actuating a latch for retaining the wheels in traveling positions, torque bars 34 and 35 for bracing the wheels from the forward end of the center beam and tongue and diagonal braces or stabilizer bars 36 and 37 for controlling the positions of the wheel brackets.

The tubular center beam 10 extends from the cross beam 26 to a point 38 and the leading end is provided with a bolt 39 which is adapted to extend through openings 40 in the tongue 11 to retain the tongue in retracted positions or in an extended position as shown in Fig. 1. The forward end of the beam 10 is also provided with a bow retaining block 41 upon which the bow of a boat on the frame rests. A chain 42 is provided in the forward end of the center beam 10, one end of which is attached to the inner end of the tongue 11, as indicated at the point 43 and the opposite end to the wall or beam as indicated at the point 44 whereby outward movement of the tongue 11 is limited to prevent the tongue being accidently drawn from the end of the center beam.

The locking rod 33 is positioned on one side of the center beam, the forward end being pivotally connected with a pin 45 to a hand lever 46 which is pivotally mounted with a pin 47 to a lug 48 on the lower side of the beam 10. The opposite end of the rod 33 is pivotally connected by a pin 49 to a lever 50 that is pivotally mounted on the beam 10 with a pin 51 and, as shown in Fig. 9, the lower end of the lever 50 provides a latch for retaining the traveler 52 in the position shown in Fig. 1 wherein the wheels 21 and 22 are drawn inwardly to traveling positions.

The traveler 52 is provided with a T-shaped slot 53 that is positioned to slide longitudinally on a T-shaped rail 54 depending from the lower portion of the center beam 10. With the parts mounted as illustrated and described the locking lever 50 is adapted to be actuated by the hand lever 46 through the rod 33 to release the traveler 52 whereas upon movement of the trailer to the rear the wheels 21 and 22 are free to spread, moving from the full line positions shown in Fig. 1 to the positions indicated with dotted lines whereby with the king bolts 13 and 14 mounted in inclined positions, as illustrated in Fig. 3, the wheel supporting brackets swing the wheels upwardly with the frame moving downwardly.

Eyes 55 and 56 on trailing ends of the stabilizer bars 36 and 37 are pivotally connected with bolts 57 and 58 with the traveler 52, the bolts being positioned in ears 59 and 60 extended from sides of the traveler 52. Upon release of the traveler 52 by operating the lever 50 with the hand lever 46 and upon movement of the trailer to the rear the wheels 21 and 22 spread outwardly drawing the stabilizer bars 36 and 37 forwardly with the traveler moving from the positions shown in full lines in Fig. 1 to the position wherein the ears 59 and 60 thereof are shown in dotted lines.

Forward ends of the stabilizer bars 36 and 37 are pivotally connected by pins 61 and 62 to ears 63 and 64 extended from the brackets 17 and 18, and the brackets which are pivotally mounted in the arms 15 and 16 with the bolts 19 and 20 are resiliently urged downwardly by springs 65 and 66 positioned in recesses 67 in the bracket and extended between flanges of the arms 15 and 16 in which the upper ends of the springs are secured by suitable means. The relative positions between the arms 24 and 25 of the cross beams 23 and the wheel suspension elements are adjustable by the adjusting screws 68 which are threaded in the arms 24 and 25 of the cross beam. The set or cap screws 68 are adapted to be set or adjusted to compensate for the live load.

The king bolts 13 and 14 are positioned at an acute angle to a vertical plane, as shown in Fig. 3 with hubs 69 and 70 at the ends of the axle 12 extended between the bifurcated hubs 71 and 72 of the arms 15 and 16. The hubs are also positioned whereby the axes of the king bolts 13 and 14 are inclined outwardly, as illustrated in Fig. 2 wherein the axes are positioned at acute angles in relation to vertically disposed planes. With the king bolts positioned as shown in Fig. 2, the wheels will spread as the trailer is moved to the rear and with the bolts positioned as shown in Fig. 3 the wheels will permit the frame carried by the inner ends of the brackets 17 and 18 to move downwardly with the wheels resting upon the ground surface, as indicated by the numeral 73.

The diagonal braces or torque bars 34 and 35 are connected to the hubs 69 and 70 as shown in Fig. 2 and the forward ends are connected, such as by welding to side surfaces of the tubular center beam 10 as shown at the points 74 and 75.

The extended end of the tongue 11 is provided with a collar 76 that is positioned to engage the leading end of the tube 10 as the tongue is moved into the beam and beyond the collar 76 the tongue is provided with a ball receiving socket 77 in which a ball is adapted to be retained by a screw 78.

The brackets 17 and 18, in which the wheels are mounted are provided with bifurcated ends forming arms 79 and 80 at the extended end of the bracket 17 and 81 and 82 at the end of the bracket 18. The wheel 21 is rotatably mounted in the arms 79 and 80 with a bolt 83 and the wheel 22 is similarly mounted in the arms 81 and 82 with a bolt 84.

The cradles 31 and 32, carried by the arms 29 and 30, extended from the tubular center beam 10 are pivotally mounted with bolts 85 and 86 in bearings 87 and 88. The cradles which are L-shaped in cross section are provided with horizontally disposed arms 89 and 90, and vertically disposed legs 91 and 92, respectively, the legs being extended through the bearings 87 and 88 and having openings for receiving the bolts 85 and 86.

The cradles 27 and 28 carried by the cross beam 26 are also L-shaped in cross section having horizontally disposed arms 93 and vertically disposed legs 94, the legs being provided with openings for receiving the bolts 95 by which the cradles are pivotally mounted in bearings 96. The ends of the cross bar 26 are provided with open sockets 97 and 98 which provide receiving sockets for guide stanchions to facilitate positioning a boat on the trailer.

A boat, such as indicated by the broken lines 99 is adapted to be secured on the cradles of the trailer frame with an elastic band 100 extended through an opening 101 in the block 41 at the bow and also through an eye 102 on the bow and also by elastic strips 103 extended from ends of a pad 104 extended over the gunwales of the boat and positioned with the ends attached to eyes 105 and 106 at the ends of the cross bar 26. It will be understood that the boat may be secured to the trailer by other suitable means.

In the modification illustrated in Figs. 11 and 12 wheels 107 and 108, rotatably mounted with a shaft 109 in a hub 110 are carried by a leaf spring 111 extended from a bracket 112 similar to the brackets or arms 15 and 16 and pivotally mounted on a bolt 113 similar to the bolts 13 and 14, of the design shown in Fig. 1. The leaves of the spring are clamped in the bracket 112 with U-bolts 114 and 115 and the bracket 112 is provided with a bifurcated end having hub sections 116 and 117. The intermediate hub 118, similar to the hubs 69 and 70 is mounted on the end of an axle, such as the axle 12. In this design, upward movement of the wheel carrying bracket is regulated by a set or cap screw 119 threaded in an arm 120 extended from a cross beam 121, similar to the arms 24 and 25 and cross beam 23. The axle, on the end of which the hub 118 is positioned is indicated by the reference numeral 122. By this means two wheels will be positioned on each side of the trailer and upward movement of the spring elements may be regulated by the cap screws 119. In this design the tubular center beam is indicated by the numeral 123.

*Operation*

With the hitch socket 77 at the leading end of the tongue 11 secured over a ball on the bumper of a motor vehicle and with the parts assembled as illustrated and described, the vehicle is actuated in reverse, driving the trailer to the rear wherein, with the latch or locking elements released, the wheels move from the position shown in full lines to the position shown in broken lines and with the wheel carrying brackets swinging around the axes of the inclined bolts 13 and 14 the wheels will follow a path in a plane perpendicular to the axes of the pivots or king bolts wherein the inner ends of the brackets drop downwardly, dropping the trailing end of the frame to a position upon the ground. With the trailing end of the frame in this position, a boat may readily be positioned on the cradles of the trailer and with the boat secured in position, the vehicle is started forwardly wherein the wheels crowd inwardly toward the sides of the frame causing the frame to move upwardly to a substantially horizontal position, as illustrated in Fig. 3.

By this means the boat carrying trailer may be dropped with backward movement of the vehilce and elevated with forward movement thereof whereby a boat may readily be removed from the trailer and also readily replaced on the trailer.

It will be understood that modifications, within the scope of the appended claims, may be made in the design and arrangement of the parts without departing from the spirit of the invention.

What is claimed is:

1. A boat trailer comprising a longitudinally disposed tubular center beam, a tongue slidably mounted in said center beam, a transversely disposed axle spaced from the forward end of the beam and secured to the under surface thereof, said axle having inclined hubs on ends thereof, wheel mounting arms pivotally connected to said hubs, wheel carrying brackets pivotally mounted on said wheel mounting arms, wheels rotatably mounted in the wheel carrying brackets, a traveler slidably mounted on the center beam, stabilizer bars connecting the traveler to the wheel carrying brackets, a latch for locking the traveler in position with the wheels positioned for travel, boat carrying cradles extended from sides of the center beam, and braces connecting ends of the axle to the forward end of the center beam, the axes of the hubs at the ends of the axle being inclined whereby upon movement of the trailer to the rear and with the locking means of the traveler released the wheels move outwardly and upwardly in relation to the axle and beam.

2. In a boat trailer, the combination which comprises an elongated tubular center beam, a tongue having a hitch on the forward end slidably mounted in the beam, means for retaining the tongue in adjusted positions in the beam, a transversely disposed axle suspended from the beam and spaced inwardly from the forward end thereof, said axle having hubs positioned on inclined axes on ends thereof, wheel mounting arms having hub elements coacting with the hubs on the ends of the axle, king bolts extended through the hub elements of the wheel mounting arms and hubs of the axle, torque rods extended between the forward end of the beam and extended ends of the axle, wheel carrying brackets pivotally mounted on said wheel mounting arms, stabilizer bars pivotally connected, at the forward ends thereof to said wheel carrying brackets and positioned with trailing ends pivotally connected to a traveler on the beam, locking means for securing the traveler on the beam in position with the wheel carrying brackets retracted, cross members carried by the beam, cradles carried by the cross members, and means for securing a boat in position upon said cradles, the axes of the hubs at the ends of the axle being inclined in both longitudinal and transversely disposed planes whereby upon movement of the trailer to the rear and with the traveler released wheels spread and move upwardly in relation to the tubular center beam.

3. In a boat trailer, the combination which comprises an elongated tubular center beam, a tongue having a hitch on the leading end slidably mounted in the leading end of the center beam, means for securing the tongue in extended and retracted positions in the beam, a traveler slidably mounted on the trailing end of the beam, an axle having inclined vertically disposed hubs on ends thereof extended laterally from sides of the beam and spaced inwardly from the forward end thereof, wheel mounting arms pivotally connected to said hubs, wheel carrying brackets pivotally mounted on said wheel mounting arms, wheels rotatably mounted in the wheel carrying brackets, an intermediate beam spaced from the axle and positioned parallel thereto, said intermediate beam having arms extended from ends thereof and positioned over the wheel carrying brackets, cap screws threaded in ends of the arms of the intermediate beam for adjusting the positions of the brackets in relation to the center beam of the trailer, diagonally positioned torque bars extended between the leading end of the center beam and extended ends of the axle, stabilizer bars positioned with trailing ends thereof pivotally connected to the traveler on the center beam and with leading ends thereof pivotally connected to the wheel carrying brackets, transversely positioned supports extended laterally from the center beam, cradles pivotally mounted on said supports, said wheel carrying brackets having resilient elements therein, and means for clamping a boat upon said cradles.

References Cited in the file of this patent
UNITED STATES PATENTS

| | | |
|---|---|---|
| 2,154,720 | Biles | Apr. 18, 1939 |
| 2,431,388 | Fitzpatrick | Nov. 25, 1947 |
| 2,469,506 | Kerr | May 10, 1949 |
| 2,513,855 | Fogwell | July 4, 1950 |